United States Patent
Hart et al.

(10) Patent No.: US 7,894,412 B2
(45) Date of Patent: Feb. 22, 2011

(54) FLOOR DETERMINATION FOR A WIRELESS DEVICE

(75) Inventors: Brian Donald Hart, Sunnyvale, CA (US); Anto Jacob, San Jose, CA (US); Nirmala Nott Venkataramani, Santa Clara, CA (US); Emilio Maldonado, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 770 days.

(21) Appl. No.: 11/852,018

(22) Filed: Sep. 7, 2007

(65) Prior Publication Data

US 2009/0067392 A1    Mar. 12, 2009

(51) Int. Cl.
*H04W 4/00* (2009.01)
(52) U.S. Cl. ..................................................... 370/338
(58) Field of Classification Search ......... 370/328–329; 455/115.3, 116.3, 226.2, 404.2, 456.1, 456.3
See application file for complete search history.

(56) References Cited

U.S. PATENT DOCUMENTS

| | | | | |
|---|---|---|---|---|
| 6,674,403 | B2 * | 1/2004 | Gray et al. | 342/463 |
| 6,978,023 | B2 * | 12/2005 | Dacosta | 380/258 |
| 7,116,988 | B2 | 10/2006 | Dietrich et al. | |
| 7,126,951 | B2 * | 10/2006 | Belcea et al. | 370/400 |
| 2004/0033795 | A1 | 2/2004 | Walsh et al. | |
| 2005/0003827 | A1 | 1/2005 | Whelan | |
| 2005/0176406 | A1 * | 8/2005 | Krishnakumar et al. | 455/410 |
| 2005/0207381 | A1 | 9/2005 | Aljadeff et al. | |
| 2005/0208952 | A1 | 9/2005 | Dietrich et al. | |
| 2005/0261004 | A1 | 11/2005 | Dietrich et al. | |
| 2005/0285793 | A1 | 12/2005 | Sugar et al. | |
| 2007/0142061 | A1 | 6/2007 | Taubenheim et al. | |

FOREIGN PATENT DOCUMENTS

WO  WO 2005/091915    10/2005
WO  WO 2005/117470    12/2005

OTHER PUBLICATIONS

Saha et al, Location Determination of a Mobile Device Using IEEE 802.11b Access Point Signals, IEEE, 6 pages, 2003.*
Robinson et al, Received Signal Strength Based Location Estimation of a Wireless LAN Client, IEEE, 5 pages, 2005.*
Written Opinion of the International Searching Authority mailed Mar. 18, 2010; regarding International Application No. PCT/US2008/074763 filed Aug. 29, 2008.

* cited by examiner

*Primary Examiner*—Frank Duong
(74) *Attorney, Agent, or Firm*—Tucker Ellis & West LLP

(57) ABSTRACT

An apparatus configured to acquire received signal strength intensities (RSSIs) for a wireless device from a plurality of access points (APs) located on a plurality floors. The apparatus is configured to determine which floor the wireless device is on by analyzing the RSSIs. In an example embodiment, the RSSIs are adjusted, and the adjusted RSSIs for each floor are summed. The floor with highest sum of adjusted RSSIs is determined to be the floor the wireless device is on. In an example embodiment, the floor that the wireless device is on is determined by calculating the probability that the wireless device is within the cell of each AP on the network, and combining the probabilities for each floor. Known RSSIs between APs can be employed for comparing measured RSSIs with the known RSSIs to determine the probability that the wireless device is within the cell of each AP.

24 Claims, 3 Drawing Sheets

FLOOR DETERMINATION FOR A WIRELESS DEVICE

TECHNICAL FIELD

This application is generally related to determining the location of a wireless device.

BACKGROUND

Wireless asset detection and tracking systems are increasing in prevalence as wireless systems are incorporated in buildings and other areas such as Internet kiosks and lounges. Additionally, radio-frequency identification (RFID) tags have been in use for many years for tracking assets, such as in shipping yards and facilities and in consumer outlets for inventory and theft management.

OVERVIEW OF EXAMPLE EMBODIMENTS

The following presents a simplified summary of the example embodiments in order to provide a basic understanding of some aspects of the example embodiments. This summary is not an extensive overview of the example embodiments. It is intended to neither identify key or critical elements of the invention nor delineate the scope of the invention. Its sole purpose is to present some concepts of the example embodiments in a simplified form as a prelude to the more detailed description that is presented later.

In accordance with an example embodiment, there is disclosed herein, an apparatus, comprising a communication interface configured to acquire received signal strength indicator (RSSI) data for a wireless device from a plurality of access points on a plurality of floors, and floor determination logic in data communication with the communication interface, the floor determination logic is configured to determine a floor that the wireless device is located by analyzing the RSSI data acquired by the communication interface. The floor determination logic is configured to calculated an adjusted RSSI for the wireless device received by each access point by one of a group consisting of adding and subtracting a predetermined value from the RSSI data acquired from each access point. The floor determination logic is configured to sum the adjusted RSSI for each floor and to select the floor with the highest sum.

In accordance with an example embodiment, there is disclosed herein, an apparatus comprising a communication interface configured to acquire received signal strength indicator (RSSI) data for a wireless device from a plurality of access points on a plurality of floors, and floor determination logic in data communication with the communication interface, the floor determination logic is configured to determine a floor that the wireless device is located by analyzing the RSSI data acquired by the communication interface. The floor determination logic is configured to determine which floor the wireless device is on by calculating an approximate probability of the wireless device being within each access point's cell. The floor determination logic is configured to combine the approximate probability for access points on each floor and to select the floor with the highest probability.

There is shown and described an example embodiment of this invention, simply by way of illustration of at least one of the best modes best suited to carry out the invention. As it will be realized, the invention is capable of other different embodiments and its several details are capable of modifications in various obvious aspects all without departing from the invention. Accordingly, the drawing and descriptions herein will be regarded as illustrative in nature and not as restrictive.

BRIEF DESCRIPTION OF THE DRAWINGS

The accompanying drawings incorporated herein and forming a part of the specification, illustrate examples of the present invention, and together with the description serve to explain the principles of the invention.

DESCRIPTION OF EXAMPLE EMBODIMENTS

Figure 1:
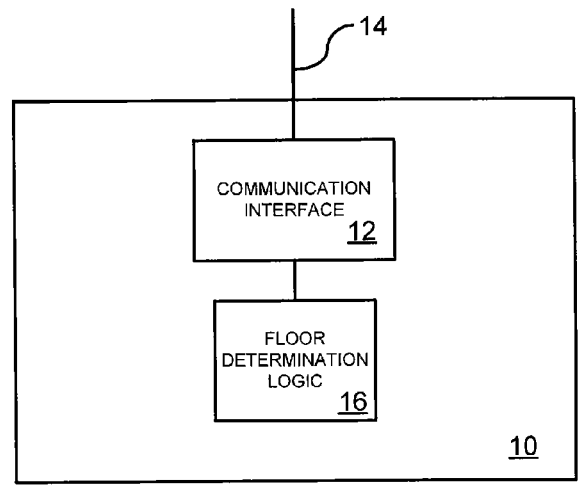
FIG. 1 is a block diagram illustrating an apparatus configured in accordance with an example embodiment

This description provides examples not intended to limit the scope of the invention, as claimed. The figures generally indicate the features of the examples, where it is understood and appreciated that like reference numerals are used to refer to like elements.

FIG. 1 is a block diagram illustrating a floor determination apparatus 10 configured in accordance with an example embodiment. Apparatus 10 comprises a communication interface 12 with a communication link 14 configured to be coupled to a network (not shown) that spans multiple floors. Communication link can be a wired link (e.g. a coaxial cable, cat. 5 link, etc.) or a wireless (e.g. RF, IR, etc.) connection. Communication interface 12 receives data from a plurality of APs. The received data includes Received Signal Strength Indicator (RSSI) data of signals received from a wireless device (which may be referred to herein as a 'wireless client' or 'client').

Floor determination logic 16 is in data communication with communication interface 12. Floor determination logic is configured to receive RSSI data from communication interface 12 and perform an algorithm for determining the floor the client is on. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software that can be executed by a processor.

Although as described herein, floor determination apparatus 10 is configured to determine the floor a wireless device is on, floor determination apparatus may also be configured with additional logic for determining the location of the wireless device on the floor as well. In addition, floor determination apparatus 10 may be co-located with another device, such as a server (e.g. an Authentication, Authorization and Accounting 'AAA' server, location determination server) or any other type of network device such as a wireless domain controller (WDS) or access point (AP).

In an example embodiment, floor determination logic determines which floor the wireless device is on by summing for each floor, the adjusted RSSI received by each AP. For example, the adjusted RSSI is computed by Measured_RSSI-X, where X is a predetermined value. In an example embodiment, X=-90 dBm, therefore, the adjusted RSSI is Measured_RSSI--90 dBm, or Measured_RSSI+90 dBm. Thus, a -80 dBm contributes 10, a -30 dBm measurement contributes 60. For example, seven access points (APs) on one floor measuring -80 dBm on floor will be selected over another floor where one access point (AP) measures -30 dBm.

In particular embodiments, a minimum predefined value is employed in determining the adjusted RSSI. For example, if measurements below -90 dBm are unreliable (even if only for one of the APs), a minimum value for RSSI. e.g., -90 dBm can be defined. For example, measured_RSSI=max(-90 dBm, measured_RSSI). This can prevent exceptionally low, unreliable reported measured RSSI values from affecting the results. Thus, in an example embodiment, the results calculated for each floor can be expressed as:

$$\sum_{i=1,n} \max(-90 \text{ dBm, measured\_RSSI})--90 \text{ dBm,}$$

where n=the number of APs on the floor.

In an example embodiment, floor determination logic 16 determines which floor a wireless device is on by calculating the approximately probability of the wireless device being within each AP's cell (or coverage area). In addition, predicted or estimated client to AP RSSIs can be employed in calculating the probabilities.

In an example embodiment, client locations are quantized to the nearest AP location, and client to AP RSSIs are predicted using knowledge of the distance between the client and AP locations, an A+10*B*log 10(d) path loss model (where A is the attenuation at 1 meter; B is the pathloss exponent or a compensation factor for environment conditions (e.g. $1/R^2$ or $1/R^3$ path loss); and d is the distance in meters), the number of intervening floors, the floor to floor pathlosses, AP antenna type and orientation, etc. For RSSIs between a client location quantized to the nearest AP location and that AP (the client is labeled "under_AP"), an assumed value, e.g. -55 dBm can be used. RSSI measurements can be predicted even when the devices are too far away for an RSSI to be measured. For N APs, this results in an N×N matrix with the assumed (e.g. -55 dBm) value on the diagonal.

In an example embodiment, the predicted client to AP RSSI values are replaced with measured AP-AP values where known or, in an example embodiment, measured and corrected AP-AP values using known measured AP-AP values after factoring out transmitting AP antenna gain and excess transmit power so as to more closely model client to AP RSSIs. Thus a combination of predicted and measured AP-AP RSSIs can be employed to deal with anomalous propagation and dynamic environments. As used herein below, the under_APi_to_APj_RSSI represents the predicted or measured RSSI of a client device somewhere in the ith AP's cell being heard by the jth AP.

The approximate probability of the wireless device being within each AP's cell is then calculated. This can be represented as:

$$p(\text{under\_APi} | \text{RSSIs of client to APs in building}) =$$

$$\prod_{j=1}^{J} p(\text{client\_RSSI\_to\_APj} | \text{under\_APi\_RSSI\_to\_AP}).$$

A unit Gaussian Probability Distribution Function (PDF) is defined as $$phi(z) = \frac{1}{\sqrt{2\pi}} e^{-0.5z^2}.$$

A unit Gaussian Cumulative Distribution Function (CDF) is defined as $$Phi(z) = \int_{-\infty}^{z} phi(u) du.$$

From the foregoing, p(client_RSSI_to_APj|under APi_to_APj_RSSI):
=phi((client_RSSI_to_APj-under _APi_to_APj_RSSI)/ shadowing_stddev_db),if client_RSSI_to_APj is observed; or
=Phi((-90-under_APi_to_APj_RSSI)/shadowing_stddev_db), if client_RSSI_to_APj is not observed or below a predetermined threshold; where client_RSSI_to_APj is the RSSI of the signal from the client received by APj, and shadowing_std_dev_db is the shadowing standard deviation. The shadowing standard deviation is the amount of RSSI variability due to walls, furniture, client/tag-AP orientation, etc with respect to line of best fit of RSSI vs log 10(d). For example, in particular embodiments the shadowing standard deviation ranges from 5-9 dB. When j=I, the shadowing standard deviation represents the range of RSSI in the cell with respect to the fixed value -55 dBm. In this case the same or a higher value of shadowing standard deviation may be used to represent this, taking into account the expected radius of the cell.

When the signal is too low, it cannot be measured, and this explains the second line in the equation above: if the minimum sensitivity is -90 dBm, then the solutions for phi( ) are all values corresponding to less than or equal to -90 dBm. This is represented by integration (i.e. Phi( )) with the limits of integration set corresponding to -90 dBm, e.g. (-90-under_APi_to_APj_RSSI)/shadowing_stddev_db).

The expression with Phi( ) for when no signal is observed implies that the client is too far away from the AP for the AP to acquire a measurable (or minimal) signal. In other contexts the usage of Phi( ) is known as exclusion. If RSSIs cannot be acquired reliably, then the expression for Phi( ) when no signal is observed can be replaced by unity (i.e.) which has the effect of performing no exclusion.

After the probabilities for all the APs have been calculated, all the AP cell probabilities are summed for each floor. For example metric(floor_k)=sum_over_APi_on_floor_k p(under_APi|RSSIs of client_to_APs_in_building). The floor with the highest metric is selected as the floor where the wireless device is located.

Figure 2:
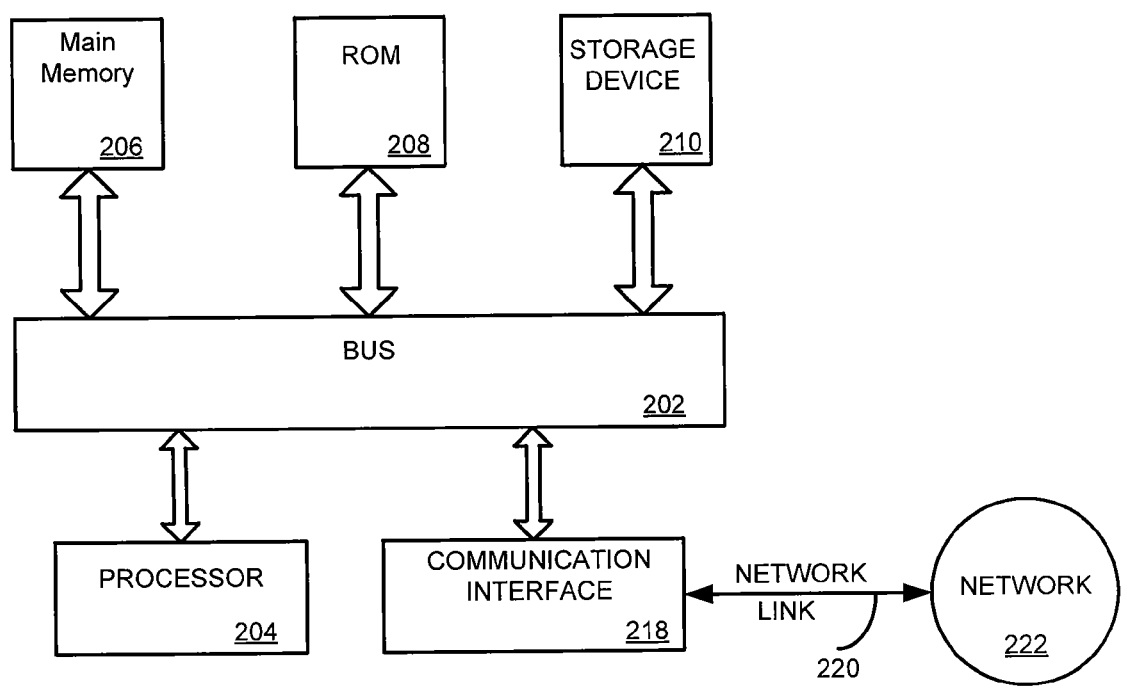
FIG. 2 is a block diagram of a computer system for implementing an example embodiment.

FIG. 2 is a block diagram of a computer system 200 for implementing an example embodiment. For example, computer system 200 is suitably adapted for implementing floor determination apparatus 10 (FIG. 1). Computer system 200 includes a bus 202 or other communication mechanism for communicating information and a processor 204 coupled with bus 202 for processing information. Computer system 200 also includes a main memory 206, such as random access memory (RAM) or other dynamic storage device coupled to bus 202 for storing information and instructions to be executed by processor 204. Main memory 206 also may be used for storing a temporary variable or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

An aspect of the invention is related to the use of computer system 200 for floor determination of a wireless device. According to one embodiment of the invention, floor determination of a wireless device is provided by computer system 200 in response to processor 204 executing one or more sequences of one or more instructions contained in main memory 206. Such instructions may be read into main memory 206 from another computer-readable medium, such as storage device 210. Execution of the sequence of instructions contained in main memory 206 causes processor 204 to perform the process steps described herein. One or more processors in a multi-processing arrangement may also be employed to execute the sequences of instructions contained in main memory 206. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to non-volatile media, volatile media, and transmission media. Non-volatile media include for example optical or magnetic disks, such as storage device 210. Volatile media include dynamic memory such as main memory 206. Transmission media include coaxial cables, copper wire and fiber optics, including the wires that comprise bus 202. Transmission media can also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 204 for execution. For example, the instructions may initially be borne on a magnetic disk of a remote computer. The remote computer can load the instructions into its dynamic memory and send the instructions over a telephone line using a modem. A modem local to computer system 200 can receive the data on the telephone line and use an infrared transmitter to convert the data to an infrared signal. An infrared detector coupled to bus 202 can receive the data carried in the infrared signal and place the data on bus 202. Bus 202 carries the data to main memory 206 from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a network 222. For example, communication interface 218 may be a local area network (LAN) card to provide a data communication connection to a compatible LAN. Wireless links may also be implemented. In any such implementation, communication interface 218 sends and receives electrical, electromagnetic, or optical signals that carry digital data streams representing various types of information.

Network link 220 typically provides data communication through one or more networks to other data devices, such as APs. For example, network link 220 may provide a connection through network 222 to the Internet. Networks 222 and the Internet 228 may use electrical, electromagnetic, or optical signals that carry the digital data to and from computer system 200, which are exemplary forms of carrier waves transporting the information.

Computer system 200 can send messages and receive data, including program codes, through the network(s), network link 220, and communication interface 218. In the Internet example, a server (not shown) might transmit a requested code for an application program through the Internet to network 222, and communication interface 218. In accordance with the invention, one such downloaded application provides for floor determination of a wireless device as described herein.

The received code may be executed by processor 204 as it is received, and/or stored in storage device 210, or other non-volatile storage for later execution. In this manner, computer system 200 may obtain application code in the form of a carrier wave.

Figure 3:
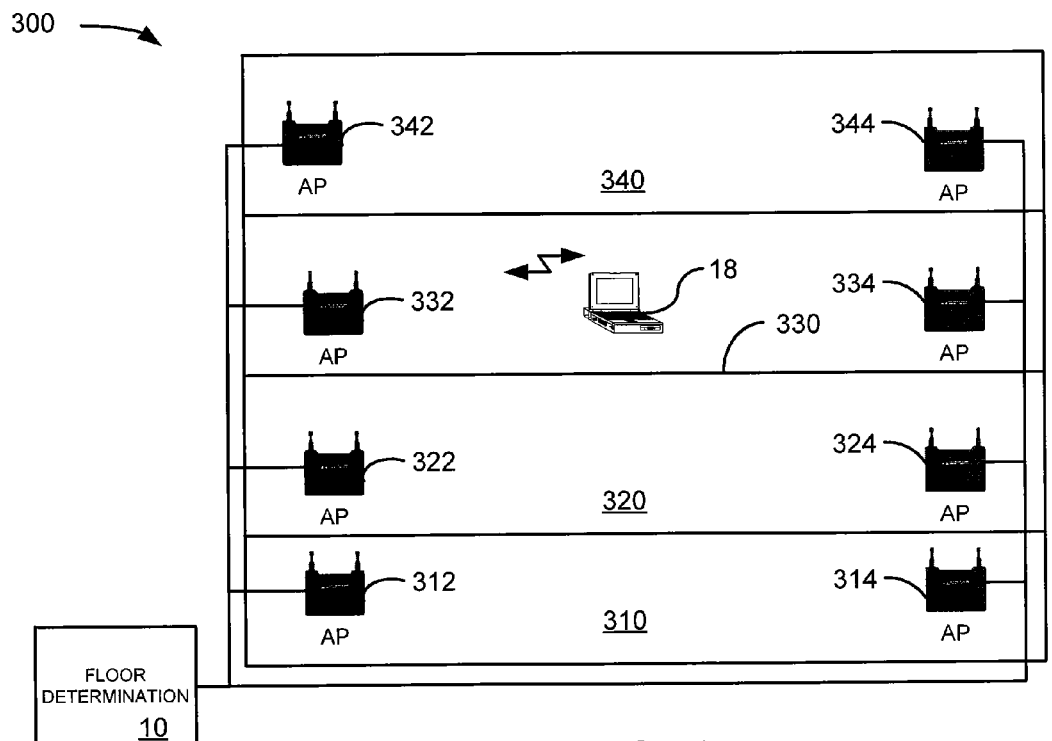
FIG. 3 illustrates an example of a network implementing floor determination.

FIG. 3 illustrates an example of a network 300 implementing floor determination. As illustrated, network 300 includes four floors 310, 320, 330, 340. Floor 310 comprises access points 312, 314. Floor 320 comprises access points 322, 324. Floor 330 comprises access points 332, 334. Floor 340 comprises access points 342, 344. Access points 312, 314, 322, 324, 332, 334, 342, 344 are in data communication with floor determination apparatus 10. When wireless device 18 transmits, access points 312, 314, 322, 324, 332, 334, 342, 344 send RSSI data to floor determination apparatus 10. In particular embodiments, an AP that does not receive a signal from device 18 does not send RSSI data to floor determination apparatus 10, in which case floor determination apparatus can use this missing RSSI in the probability calculations in a way that tends to exclude nearby regions. In an example embodiment, access points 312, 314, 322, 324, 332, 334, 342, 344 also send AP-AP RSSI data to floor determination server 10. For example AP 312 can send the RSSI data for signals received from APs 314, 322, 324, 332, 334, 342, 344. This RSSI data may be corrected (by removing the effects of different antenna gains and/or different transmit powers) so the RSSI data is closer to an RSSI from a client under or nearby AP 312 to APs 314-344. Based on the RSSI data received from Access points 312, 314, 322, 324, 332, 334, 342, 344, floor determination apparatus 10 can determine the floor (floor 330 in the example illustrated in FIG. 3) that wireless device 18 is on.

Although network 300 illustrates a selected number of floors and APs on each floor, those skilled in the art should readily appreciate that the number of floors and/or APs on the floors can be any physically realizable number. The number of floors and APs selected for network 300 were merely selected for ease of illustration and should no way be construed as limiting the number of floors or APs that the apparatuses or methods described herein are capable of handling.

Figure 4:
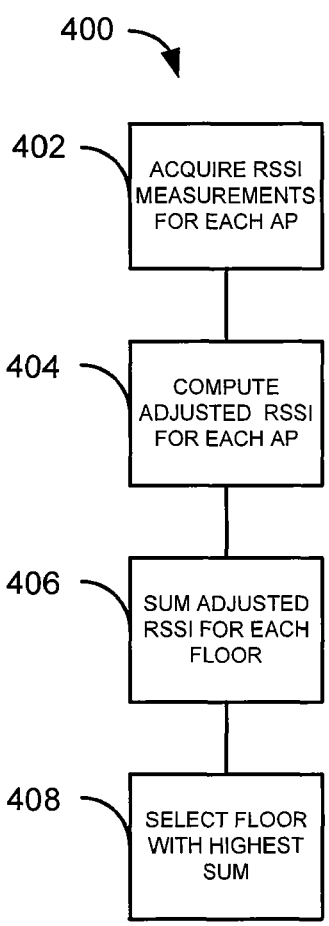
FIG. 4 illustrates an example methodology for determining the floor a client is on based on adjusted RSSI values.
Figure 5:
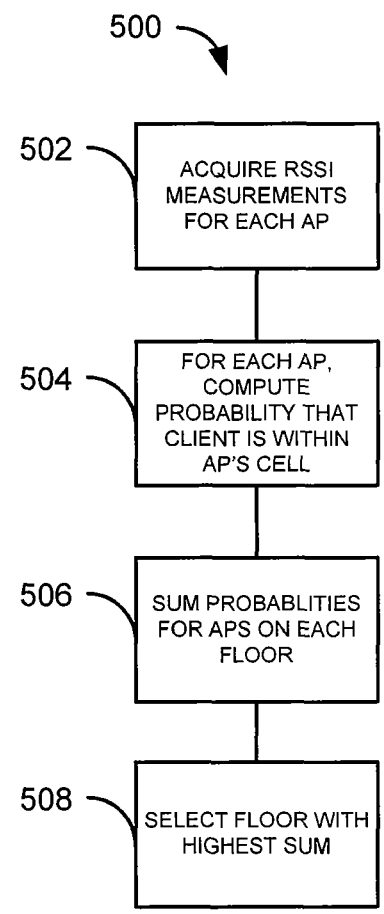
FIG. 5 illustrates an example methodology for determining the floor a client is on that employs probability functions.

In view of the foregoing structural and functional features described above, methodologies in accordance with example embodiments will be better appreciated with reference to FIGS. 4 and 5. While, for purposes of simplicity of explanation, the methodologies of FIGS. 4 and 5 are shown and described as executing serially, it is to be understood and appreciated that the example embodiments are not limited by the illustrated order, as some aspects could occur in different orders and/or concurrently with other aspects from that shown and described herein. Moreover, not all illustrated features may be required to implement a methodology in accordance with an aspect the example embodiment. Embodiments of the present invention are suitably adapted to implement the methodology in hardware, software, or a combination thereof.

FIG. 4 illustrates an example methodology 400 for determining the floor a client is on based on adjusted RSSI values. At 402, the RSSI measurement (measured_RSSI) for each AP is acquired.

At 404, an adjusted RSSI (Adjusted_RSSI) is computed for each RSSI measurement. The adjusted RSSI is computed by subtracting (or adding) a predetermined value from the measured RSSI. For example, Adjusted_RSSI=measured_RSSI−X, where X is the predetermined value. In an example embodiment, X=−90 dBm, yielding Adjusted_RSSI=measured_RSSI−−90 dBm or Adjusted_RSSI=measured_RSSI+90 dBm.

In particular embodiments, RSSI measurements below a predetermined value can be adjusted to the predetermined value. For example, if −90 dBm is the lowest, reliable measurement for one or more APs, the −90 dBm can be employed as the minimum value and any RSSI measurement below 90 dBm will be changed to −90 dBm, which can be expressed as measured_RSSI=MAX(measured_RSSI, −90 dBm).

At 406, the adjusted RSSI values for each floor are summed. At 408, the floor with the highest sum is selected as the floor the wireless device is located.

FIG. 5 illustrates an example methodology 500 for determining the floor a client is on that employs probability functions. At 502, the RSSI measured by each AP is acquired. The RSSI measured may suitably comprise the RSSI of the wireless device as measured by each AP. In particular embodiments, predicted RSSI values between APs are computed. In some embodiments, the predicted RSSI values are replaced by measured RSSI values or measured and corrected RSSIs where available.

At 504, the probability that the wireless device is within each AP's cell is computed. Predicted or known client to AP RSSIs can be employed in calculating the probabilities.

In an example embodiment, client to AP RSSIs are predicted using knowledge of the distance between the APs, an A+10*B*log 10(d) path loss model (where A is the attenuation at 1 meter; B is the pathloss exponent or a compensation factor for environment conditions (e.g. $1/R^2$ or $1/R^3$ path loss), the number of intervening floors, the floor to floor pathlosses, AP antenna type and orientation, etc. For inside the APs cell (under_AP) an assumed value, e.g. −55 dBm can be used. A predefined minimum value, e.g. −90 dBm can be used for unmeasurable values. For N APs, this results in an N×N matrix with the assumed (e.g. −55 dBm) value on the diagonal.

In an example embodiment, the predicted client to AP RSSI values are replaced with measured AP-AP values where known or, in an example embodiment, measured and corrected AP-AP values using known measured AP-AP values after factoring out transmitting AP antenna gain and excess transmit power so as to more closely model client to AP RSSIs. Thus a combination of predicted and measured AP-AP RSSIs can be employed to deal with anomalous propagation and dynamic environments. As used herein below, the under_APi_to_APj_RSSI represents the predicted or measured RSSI of a client device somewhere in the ith AP's cell being heard by the jth AP.

The approximate probability of the wireless device being within each AP's cell is then calculated. This can be represented as:

p(under_APi| RSSIs of client to APs in building) =

$$\prod_{j=1}^{J} p(\text{client\_RSSI\_to\_APj} | \text{under\_APi\_RSSI\_to\_AP}).$$

A unit Gaussian Probability Distribution Function (PDF) is defined as $$phi(z) = \frac{1}{\sqrt{2\pi}} e^{-0.5 z^2}.$$

A unit Gaussian Cumulative Distribution Function (CDF) is defined as $$Phi(z) = \int_{-\infty}^{z} phi(u) du.$$

From the foregoing, p(client_RSSI_to_APj| under APi_to_APj_RSSI):
=phi((client_RSSI_to_APj−under_APi_to_APj_RSSI)/ shadowing_stddev_db), if client_RSSI_to_APj is observed; or
=Phi((−90−under_APi_to_APj_RSSI)/shadowing_stddev_db), if client_RSSI_to_APj is not observed or below a predetermined threshold; where client_RSSI_to_APj is the RSSI of the signal from the client received by APj, and shadowing_std_dev_db is the shadowing standard deviation. The shadowing standard deviation is the amount of RSSI variability due to walls, furniture, client/tag-AP orientation, etc with respect to line of best fit of RSSI vs log 10(d). For example, in particular embodiments the shadowing standard deviation ranges from 5-9 dB. When j=I, the shadowing standard deviation represents the range of RSSI in the cell with respect to the fixed value −55 dBm. In this case the same or a higher value of shadowing standard deviation may be used to represent this, taking into account the expected radius of the cell.

When the signal is too low, it cannot be measured, and this explains the equation for Phi((−90−under_APi_to_APj_RSSI)/shadowing_stddev_db). If the minimum sensitivity is −90 dBm, then the solutions for phi( ) are all values corresponding to less than or equal to −90 dBm. This is represented by integration (i.e. Phi( )) with the limits of integration set corresponding to −90 dBm, e.g. (−90−under_ APi_to_APj_RSSI)/shadowing_stddev_db).

The expression with Phi( ) for when no signal is observed implies that the client is too far away from the AP for the AP to acquire a measurable (or minimal) signal. In other contexts the usage of Phi( ) is known as exclusion. If RSSIs cannot be acquired reliably, then the expression for Phi( ) when no signal is observed can be replaced by unity (i.e.) which has the effect of performing no exclusion.

At 506, all the probabilities are summed for each floor. For example metric(floor_k)=sum_over_APcell_i_on_floor_k p(under_APi|RSSIs of client_to_APs_in_building). At 508, the floor with the highest metric is selected as the floor where the wireless device is located.

What has been described above includes example implementations. It is, of course, not possible to describe every conceivable combination of components or methodologies for purposes of describing the present invention, but one of ordinary skill in the art will recognize that many further combinations and permutations are possible. Accordingly, the scope of the appended claims interpreted in accordance with the breadth to which they are fairly, legally and equitably entitled include all such equivalents, alterations, modifications and variations.

The invention claimed is:

1. An apparatus, comprising:
   a communication interface configured to acquire received signal strength indicator (RSSI) data for a wireless device from a plurality of access points on a plurality of floors; and
   floor determination logic in data communication with the communication interface, the floor determination logic is configured to determine a floor that the wireless device is located on by analyzing the RSSI data acquired by the communication interface;
   wherein the floor determination logic is configured to calculate an adjusted RSSI from the acquired RSSI data for the wireless device received by every access point by one of a group consisting of adding and subtracting a predetermined value from the RSSI data acquired from each access point;
   wherein the floor determination logic is configured to sum the adjusted RSSI for each floor; and
   wherein the floor determination logic is configured to select the floor with the highest sum.

2. An apparatus according to claim 1, wherein the floor determination logic is configured to calculate the adjusted RSSI based on the maximum value selected from a group consisting of a predefined minimum value and the acquired RSSI.

3. An apparatus according to claim 2, wherein the predefined minimum value is −90 dB.

4. An apparatus according to claim 3, wherein the predetermined value is −90 dB.

5. An apparatus according to claim 1, wherein the predetermined value is −90 dB.

6. An apparatus, comprising:
   a communication interface configured to acquire received signal strength indicator (RSSI) data for a wireless device from a plurality of access points on a plurality of floors; and
   floor determination logic in data communication with the communication interface, the floor determination logic is configured to determine a floor that the wireless device is located by analyzing the RSSI data acquired by the communication interface;
   wherein the floor determination logic is configured to determine which floor the wireless device is on by calculating an approximate probability of the wireless device being within each access point's cell;
   wherein the floor determination logic is configured to combine the approximate probability for access points on each floor; and
   wherein the floor determination logic is configured to determine the wireless device is located on the floor with the highest combined approximate probabilites.

7. An apparatus according to claim 6, wherein the floor determination logic employs predicted RSSIs between clients under or nearby an AP to another access point to determine the approximately probability of the wireless device being within each access point's cell.

8. An apparatus according to claim 7, wherein the floor determination logic uses measured RSSIs between access points when known.

9. An apparatus according to claim 8, wherein the floor determination logic factors out transmitting access point antenna gain and excess transmitter power.

10. An apparatus according to claim 6, the floor determination logic is further configured for determining the probability the wireless device is within a first access point's cell by comparing a measured RSSI from the wireless device by a second access point with one of a group consisting of a predicted RSSI and a measured RSSI between the first and second access points.

11. An apparatus according to claim 10, the floor determination logic further comprises logic for adjusting the result of the comparison with a shadowing standard deviation between the first and second access points.

12. An apparatus according to claim 6, the floor determination logic is further configured for determining the probability the wireless device is within a first access point's cell by comparing a predetermined minimum RSSI with one of a group consisting of a predicted RSSI and a measured RSSI between the first access point and the second access point responsive to the second access point not receiving a signal from the wireless device.

13. An apparatus according to claim 6, the floor determination logic is further configured for determining the probability the wireless device is within a first access point's cell by comparing a difference between a predetermined minimum RSSI with one of a group consisting of a predicted RSSI and a measured RSSI between the first access point and the access point being evaluated responsive to the access point being evaluated not receiving a signal from the wireless device.

14. An apparatus according to claim 6, the floor determination is configured to determine the probability that the wireless device is within a first access point's cell by subtracting one of a group consisting of a predicted RSSI and a measured RSSI between the first access point and a second access point from a RSSI measured for the wireless device measured by the second access point, wherein the result of the subtraction is divided by a shadowing standard deviation between the first access point and the second access point, when the RSSI from the wireless device is measured by the second access point; and
   the floor determination logic is further configured to determine the probability that the wireless device is within a first access point's cell by comparing a predetermined minimum signal with one of a group consisting of a predicted RSSI and a measured RSSI between the first and second access points responsive to the second access point not receiving a signal from the wireless device.

15. An apparatus according to claim 6, the floor determination logic is configured to determine the probability that the wireless device is within a first access point's cell by computing a function for every access point on the network, the function comprising one of a group consisting of:
   a difference between an RSSI measured by an access point being evaluated and one of a group consisting of a predicted RSSI and a measured RSSI between the first access point and the access point being evaluated, wherein the difference is divided by a shadowing standard deviation between the first access point and the access point being evaluated, responsive to the access point being evaluated detecting a RSSI above a predetermined threshold; and a difference between a predetermined minimum RSSI with one of a group consisting of a predicted RSSI and a measured RSSI between the first access point and the access point being evaluated responsive to the access point being evaluated not receiving a signal from the wireless device.

16. An apparatus according to claim 15, wherein the function evaluates the RSSI of the wireless device received by the first access point by one of a group consisting of:

a difference between an RSSI measured by the first access point and a predefined within cell RSSI, wherein the difference is divided by a shadowing standard deviation for the first access point's cell; and the difference between a predetermined minimum RSSI with the predefined within cell RSSI responsive to the first access point not receiving a signal from the wireless device.

17. An apparatus according to claim 16, wherein the probability for the wireless device being within the first access point's cell comprises the product of the function computed for every access point on the network operating on a same channel as the first access point 18. An apparatus according to claim 17, wherein the predefined minimum is −90 dBm and the predefined within cell RSSI is −55 dBm.

19. An apparatus, comprising:

means for acquiring received signal strength intensities (RSSIs) for between a plurality of access points on a network distributed among a plurality of floors;

means for acquiring a RSSI value for a wireless client from each access point on the network;

means for determining the probability the wireless device is within an access point's cell, comprising means for comparing for each access point the measured RSSI value for the wireless client with an RSSI value expected when the client is within proximity of the access point and an access point providing the measured RSSI value, the means for determining the probability determines the probability for each access point on the network;

means for determining the probability for a floor, comprising means for combining the probabilities of each access point on the floor, the means for determining the probability for a floor determining the probability for all floors on the network; and means for determining which floor the wireless device is on, comprising means for selecting the floor with the highest combined probability.

20. An apparatus according to claim 19, the means for comparing further comprising means for adjusting the comparison based on a shadowing standard deviation.

21. A method, comprising:

receiving received signal strength indicator (RSSI) data for a wireless device from a plurality of access points having associated cells dispersed on a plurality of floors;

calculating an approximate probability of the wireless device located within each access point's cell;

combining the calculated probabilities for each floor; and determining a floor the wireless device is located on by selecting the floor with the highest combined calculated probabilities.

22. The method according to claim 21, the calculating further comprises comparing predicted RSSIs of clients within an access point's cell to measured RSSIs.

23. The method according to claim 22, the comparing further comprises adjusting results of the comparison with a shadowing standard deviation between access points.

24. The method according to claim 22, the comparing further comprises using a predefined value responsive to an RSSI being less than the predefined value.

* * * * *